United States Patent Office 3,461,682
Patented Aug. 19, 1969

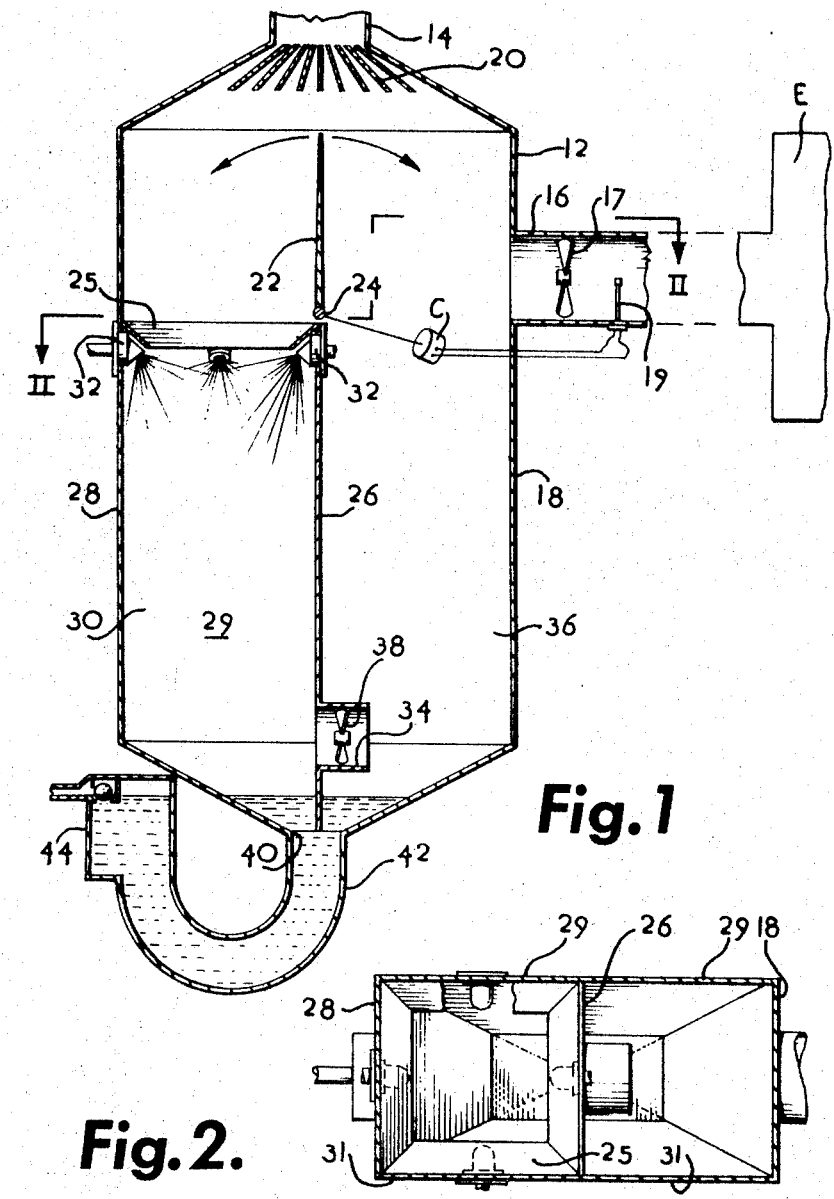

3,461,682
GAS COOLING
Kenneth Darby, Warley, Oldbury, near Birmingham, England, assignor to Lodge-Cottrell Limited, Birmingham, England, a British company
Filed Sept. 27, 1967, Ser. No. 670,855
Claims priority, application Great Britain, Oct. 22, 1966, 47,461/66
Int. Cl. F25b 37/00; F25d 17/06
U.S. Cl. 62—85    6 Claims

ABSTRACT OF THE DISCLOSURE

A method of cooling gas comprising the steps of dividing hot gas into a plurality of streams, contacting at least one stream directly with cooling water, reuniting the streams, and varying the relative proportions of the streams according to the degree of cooling required.

BACKGROUND

This invention is concerned with improvements in or relating to gas cooling.

In, for example, the cleaning of dust-laden waste gas by an electro-precipitator frequently the gas is cooled before entering the electro-precipitator.

SUMMARY

It is an object of the invention to provide an improved method of cooling waste gas.

It is another object of the invention to provide improved gas cooling apparatus for cooling waste gas.

The invention provides a method of cooling a waste gas comprising the steps of dividing hot gas into a plurality of streams, contacting at least one stream directly with cooling water, reuniting the streams, and varying the relative proportions of the streams according to the degree of cooling required.

The invention also provides waste gas cooling apparatus comprising means for dividing hot gas into a plurality of streams and for varying the relative proportions of the streams, and means for spraying cooling water into at least one stream, the arrangement being such that in the operation of the apparatus the streams are reunited after cooling water has been sprayed into said stream and substantially separated therefrom, the relative proportions of the streams being varied according to the degree of cooling required.

DRAWINGS

There now follows a description, to be read with reference to the accompanying drawings, of apparatus embodying the invention. This description is given by way of example of the invention only and not by way of limitation thereof.

In the drawings:

FIGURE 1 shows a sectional side view of the apparatus; and

FIGURE 2 shows a section on the line II—II of FIGURE 1.

DESCRIPTION

The apparatus comprises a vertical tower 12 of generally rectangular cross-section having an inlet 14 for hot gas which leads from a source of dust-laden waste gas to be cleaned and is located axially in an upper end portion of the tower 12. The tower 12 also has an outlet 16 for cool gas located in a side wall 18 of the tower and leading to an electro-precipitator E; a fixed vane member 17 is provided in the outlet 16 as a gas mixing device; a temperature-sensing device 19 is also provided in the outlet 16. The gas is cooled in the tower 12 from about 500° C. to between 250° C. and 70° C.

A plurality of gas distribution vanes 20 are mounted in the tower 12 following the inlet 14.

The apparatus comprises a flat damper plate 22 mounted in the tower 12, the damper plate 22 being adjustable by pivotal movement about a horizontal hinge 24 from which the damper plate 22 extends upwardly; the damper plate 22 is adapted to divide the hot gas into two streams. The apparatus also comprises a stationary vertical baffle 26 which extends downwardly from the hinge 24 to the bottom of the tower 12. The damper plate 22, the baffle 26 and side walls 28, 29, 31 of the tower 12 provide a vertically extending duct 30 of square cross-section. Crude sprays 32 suitable for use with unclean recycled water are mounted in the duct 30 below the hinge 24 and are arranged when in operation to spray water over the whole cross-section of the duct 30: a sloping skirt 25 extends over the sprays 32. An outlet 34 in the baffle 26 adjacent the bottom of the tower 12 leads from the duct 30 to a duct 36 of square cross-section provided by the damper plate 22, the baffle 26 and the side walls 18, 29, 31. A fixed vane member 38 is provided in the outlet 34 as a moisture eliminator.

The tower 12 has an outlet 40 for cooling water separated from the gas which is located axially in a lower end portion of the tower 12. The outlet 40 comprises a U-tube 42 which terminates in a ball valve chamber 44 which acts to maintain a liquid seal of substantially constant level in the bottom of the tower 12 adjacent the outlet 40.

In the operation of the apparatus hot gas entering the tower 12 through the inlet 14 is divided into two streams by the damper plate 22, one of which streams passes directly through the duct 36 towards the outlet 16, and the other of which streams is directed by the damper plate 22 and the baffle 26 through the duct 30, downwardly past the sprays 32 which spray cooling water into it, and through the outlet 34 and the duct 36 towards the outlet 16 to be reunited with the other stream adjacent the outlet 16; water separates from the gas at the bottom of the tower 12 and remaining water droplets are removed from the stream passing through the outlet 34 by the fixed vane member 38. The temperature of the reunited gas is sensed by the sensing device 19 which transmits a corresponding signal to a control device C of known type which is arranged to move the damper plate 22 about the hinge 24 to vary the relative proportions of the two streams to maintain a substantially constant gas temperature at the outlet 16 which temperature is preset at the control device; this temperature setting of the control device can be adjusted according to the degree of cooling required.

I claim:

1. A method of cooling a waste gas comprising the steps of introducing hot waste gas into a vertical cooling tower, dividing said introduced gas into a plurality of streams, contacting at last one stream in the tower directly with cooling water sprayed in the tower, separating water from said one stream, reuniting the streams in the tower, varying the relative proportions of the streams according to the degree of cooling required, and withdrawing the reunited streams from the tower.

2. In a method of cleaning a dust-laden waste gas, cooling the waste gas by a method according to claim 1 and passing the cooled waste gas through an electro-precipitator to precipitate dust therefrom.

3. A vertical waste gas cooling tower comprising inlet means for introducing hot gas into the tower, means for dividing said introduced gas into a plurality of streams and for varying the relative proportions of the streams, means mounted in the tower for spraying cooling water into at least one stream, means for separating water from said one stream, and outlet means for reuniting the streams in the tower and withdrawing the reunited streams from the tower.

4. A tower according to claim 3, wherein said dividing means comprises a pivoted member extending toward the inlet means and wherein the position of said member for proportionately dividing said introduced gas into streams is controlled by temperature sensitive means in the path of the reunited streams at said outlet means operatively connected to said pivoted member.

5. A tower according to claim 3, comprising a shell wall and wherein said dividing means comprises (a) an upwardly-extending flat damper member adapted to divide the gas into two streams, (b) horizontal hinge means hinging the flat damper member at a lower end thereof, (c) means for adjusting the damper member about the hinge means, and (d) a stationary vertical baffle extending downwardly from the hinge means, said shell wall and said baffle defining a passage to one side of the baffle in which the spraying means is located and which is adapted to direct one of said two streams downwardly past the spraying means and then past the separating means towards the outlet means, and another passage to the other side of the baffle adapted to direct the other stream directly from the inlet means towards the outlet means.

6. In dust-laden waste gas cleaning plant, a tower according to claim 3 and an electro-precipitator and wherein the outlet means of the tower leads to the electro-precipitator for passing cooled waste gas from the tower through the electro-precipitator for dust to be precipitated therefrom.

References Cited
UNITED STATES PATENTS

| | | | |
|---|---|---|---|
| 1,749,763 | 3/1930 | Fleisher | 62—92 |
| 1,878,618 | 9/1932 | Baker | 62—121 |
| 1,986,529 | 1/1935 | Ray | 62—314 |
| 2,044,352 | 6/1936 | Evans | 62—309 |
| 3,153,914 | 10/1964 | Meckler | 62—97 |

WILLIAM J. WYE, Primary Examiner

U.S. Cl. X.R.

62—91, 97, 121, 171, 187, 314